L. PONDELICK.
DIFFERENTIAL GEARING.
APPLICATION FILED SEPT. 10, 1921.
1,431,036.
Patented Oct. 3, 1922.
2 SHEETS—SHEET 1.
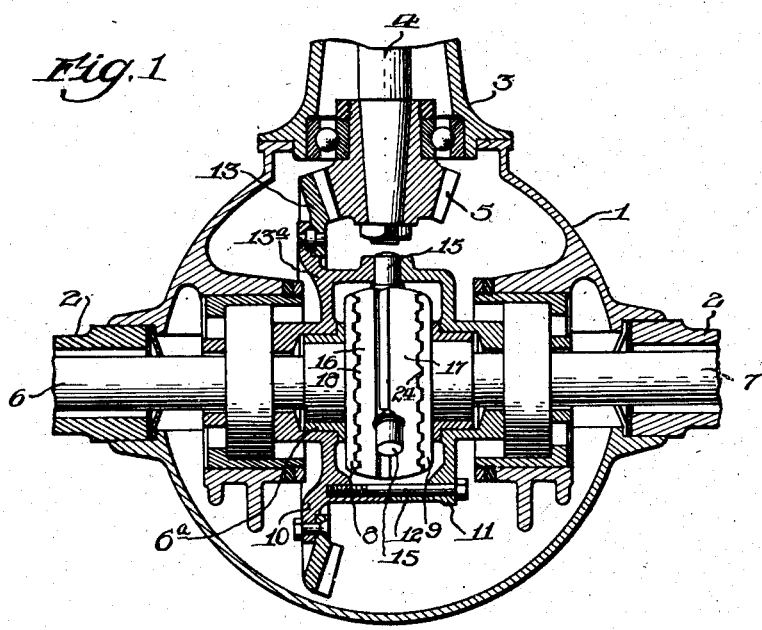
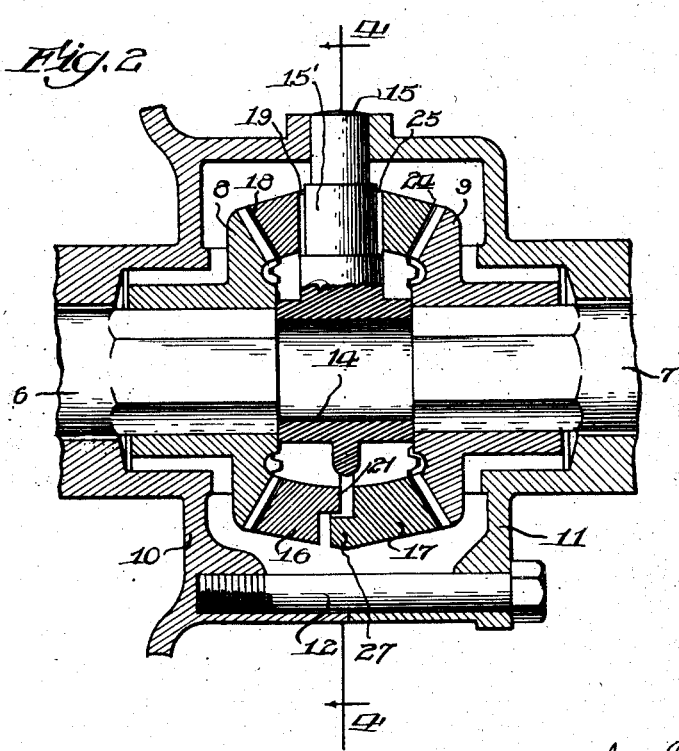
Inventor:
Leo Pondelick
By Fred Gerlach
his Atty.

L. PONDELICK.
DIFFERENTIAL GEARING.
APPLICATION FILED SEPT. 10, 1921.
1,431,036.
Patented Oct. 3, 1922.
2 SHEETS—SHEET 2.
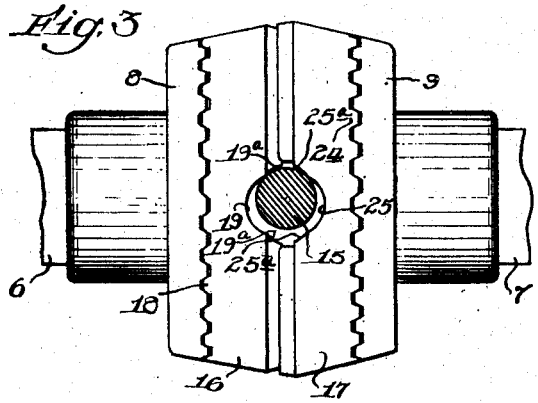
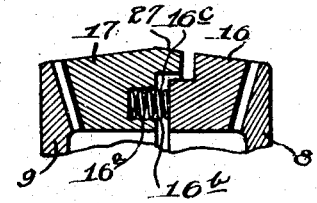
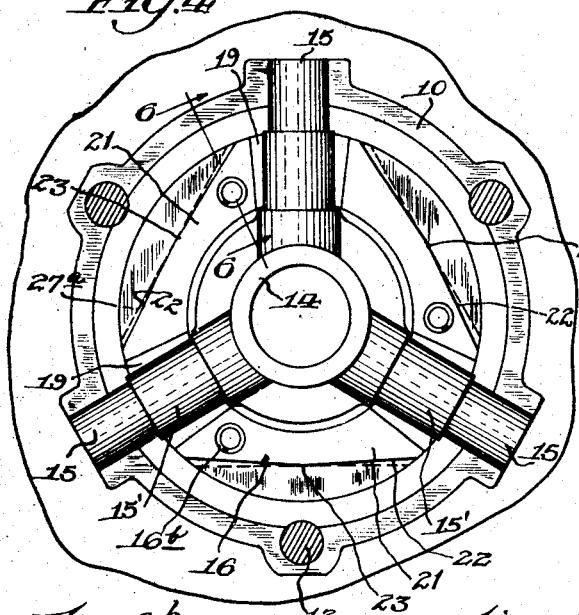
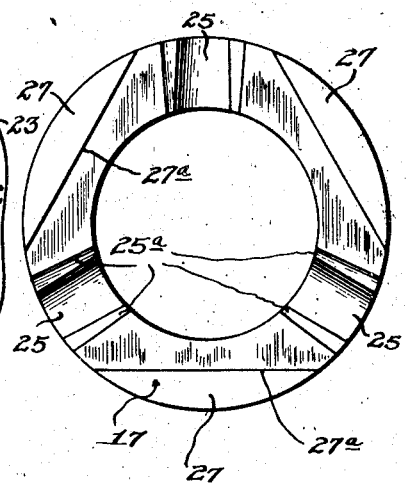
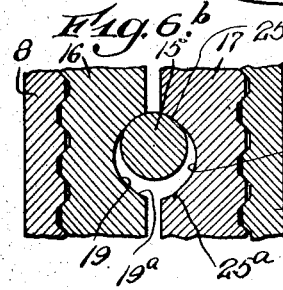
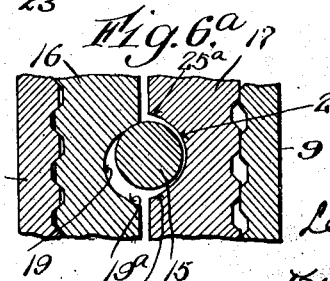
Inventor:
Leo Pondelick
By Fred Gerlach
Atty.

Patented Oct. 3, 1922.

1,431,036

UNITED STATES PATENT OFFICE.

LEO PONDELICK, OF CHICAGO, ILLINOIS, ASSIGNOR TO ELMER O. BEARDSLEY, OF CHICAGO, ILLINOIS.

DIFFERENTIAL GEARING.

Application filed September 10, 1921. Serial No. 499,712.

*To all whom it may concern:*

Be it known that I, LEO PONDELICK, a citizen of the United States, and a resident of Chicago, in the county of Cook and State of Illinois, have invented certain new and useful Improvements in Differential Gearing, of which the following is a full, clear, and exact description.

The invention relates to differential gearing of that type in which clutch-members are interposed between the axle members to positively drive them and which will permit one of the axle members to rotate faster than the other by disengagement from one of the clutch-members while the other remains in operative connection with the other clutch-member.

The object of the invention is to provide differential gearing of this type which is simple in construction and efficient in operation.

The invention consists in the several novel features hereinafter set forth and more particularly defined by claims at the conclusion hereof.

In the drawings: Fig. 1 is an axial section of a differential gearing embodying the invention. Fig. 2 is a section through the differential drum and the parts contained therein. Fig. 3 is an elevation of the clutch-members. Fig. 4 is a section taken on line 4—4 of Fig. 2, one clutch being shown in section and the the other being shown by dotted lines. Fig. 5 is a face view of the other clutch ring. Fig. 6 is a section taken on line 6—6 of Fig. 4. Fig. 6ª is a section through one of the arms of the driving spider and the driving surfaces on the clutch rings showing the parts in position assumed when one clutch-ring is disconnected from its traction-wheel. Fig. 6ᵇ is a similar view showing both clutch rings driven by the spider.

The invention is exemplified in a structure comprising a differential housing 1; sleeves 2 for enclosing the axle sections 6 and 7 respectively; and a drive shaft 4 suitably journalled in a housing 3 and having a drive pinion 5 fixed to its inner end. The inner ends of axle sections 6 and 7 are journalled in suitable bearings 6ª respectively which are supported in the housing 1 and bevelled toothed gears 8 and 9 are fixedly secured to the inner ends of the axle sections respectively, as well understood in the art. Pinion 5 meshes with a gear-wheel 13 which is secured to a flange 13ª on the differential gear drum which consists of sections 10 and 11 which are secured together by bolts 12.

A driving spider comprises a hub 14 and radial arms formed with studs 15 which are fixedly held in mating semicylindrical recesses in abutting faces of the drum-sections. Clutch-members 16 and 17 are disposed on opposite sides of the spider for coaction with the gears 8 and 9 respectively. Clutch member 16 is in the form of a ring and provided with teeth 18 on the outer side thereof for cooperation with the teeth of gear 8 to drive the axle section 6. The inner face of clutch-ring 16 is provided with a plurality of curved recesses 19, which are adjacent the sides of portions 15′ of the radial arms. Clutch member 17 is also in ring form and is provided with teeth 24 on the outer side thereof for cooperation with the teeth of driven gear 9 to drive the axle section 7. The inner face of clutch-ring 17 is provided with curved recesses 25 adjacent the portions 15′ of the spider arms and notches 25ª at the ends of the recesses. Clutch-ring 17 is provided with pockets 16ª on its inner face to retain springs 16ᵇ, which are provided with bearing studs 16ᶜ, to engage the clutch-member 16 and yieldingly press the clutch-members apart, so that they will both be normally operatively connected with the gears 8 and 9 respectively to drive both axle sections.

The notches 19ª and 25ª serve as driving surfaces or abutments engaged by the front and rear portions of the spider arms and are shaped to substantially conform to and engage only said portions of the spider arms. These driving surfaces extend more nearly in the direction of the axis of the gearing so that there will be substantially no spreading pressure exerted by the spider arms against the clutch-members while they are being driven by the spider and this will relieve the gear teeth on the clutch-members and gears 8 and 9 of excessive locking pressure. The recesses 19 and 25 between the notches at their ends are curved to permit sufficient inward axial movement of the clutch-members respectively to disengage the gear teeth on the clutch-members from the gears 8 and 9, when the members are driven faster than the spider by contact of the traction wheel with the road.

Clutch-member 17 is provided with projecting lugs 27, having inner chordal surfaces 27ª. Clutch-ring 16 is provided with projecting lugs 21 which have chordal outer faces 22 adapted to be overlapped by lugs 27 and for engagement with the chordal faces 27ª on the clutch-ring 17. The faces of the chordal outer faces 22 of lugs 21 are inclined slightly from a middle point 23 to their outer ends.

In operation, both of the arms of the driving spider engaging the cam recesses in the clutch-members 16 and 17 will normally operate both of the clutch-members 16 and 17, which are normally held in engagement with the gears 8 and 9 respectively by springs 16ª, and this operation will continue as long as the traction-wheels driven by the axle sections travel at the same speed. In turning a corner, a traction-wheel travelling over the greatest arc will be caused to travel faster than the other traction-wheel. This increase of speed will cause the axle section for the road-driven wheel to rotate its coacting clutch-ring so that the front driving notches of the recesses therein will rotate away from the spider-arms, and when that has occurred, the clutch-ring will be free to move axially inward. Said clutch-ring will rotate with the road-driven wheel until the overlapping lugs 21 and 27 on the clutch-rings pass into engagement as the result of the differential travel between the traction-wheels. Thereupon, the clutch ring for the road-driven wheel will be arrested, and the teeth on the gear wheel rotating therewith will force said clutch ring inwardly so that the gear teeth between said ring and said gear-wheel will clear one another and permit the road-driven wheel to travel independently of the other traction-wheel. During this independent travel, the released clutch-ring will be rotated by the other clutch-ring. When the speed of the road-driven traction wheel is decreased to the speed of the power driven traction-wheel, the clutch ring for the former will be forced into engagement with its coacting gear by springs 16ª. As soon as the traction wheel which has been driven by the road wheel ceases to be driven thereby, its clutch-ring will be retarded, so that its cam recesses 19ª or 25ª will pass into engagement with the arms of the driving spider.

It will be understood that the clutch-members are axially movable to permit disengagement from the gear-wheels on the axle sections and the contiguous faces of the lugs 21 and 27 are formed to permit this movement. It will also be understood that the recesses in the clutch-rings are formed to permit this axial movement and also slight rotary movement relatively to the spider to release the clutch-rings from driving engagement with the spider when either is driven by a traction-wheel.

The invention exemplifies differential gearing in which clutch-members are used for driving the axle members respectively, and which are provided with overlapping lugs having chordal faces which are adapted to limit the relative movement of the clutch-rings. It will be observed that, in the lugs described, those on one clutch-ring are disposed within those on the other ring, so that they are subjected to radial pressure as distinguished from circumferential pressure and, therefore, this construction is durable and well adapted to withstand the stresses to which they are subjected in practice. The invention also exemplifies a construction in which the driving notches in the clutch-members are formed so as to avoid substantially spreading pressure against the clutch-members which is likely to jam the gear-teeth of the clutch-members against gears 8 and 7.

The invention is not to be understood as restricted to the details set forth, since these may be modified within the scope of the appended claims, without departing from the spirit and scope of the invention.

Having thus described, the invention, what I claim as new and desire to secure by Letters Patent, is:

1. Differential gearing comprising in combination axle sections, gears secured to the sections respectively, a drum, means for driving the drum, a driving spider in the drum, and axially shiftable clutch-members driven by the spider disposed between the spider and said gears respectively, having teeth for engaging said gears respectively, having limited rotation relatively to the spider and to each other, and provided with overlapping integral stop lugs, the lugs on one ring being disposed inwardly of the others.

2. Differential gearing comprising in combination axle sections, gears secured to the sections respectively, a drum, means for driving the drum, a driving spider in the drum, and axially shiftable clutch-members between the spider and said gears respectively, having teeth for engaging said gears respectively, having cam recesses for the spider, having limited rotation relatively to the spider and provided with overlapping integral stop lugs, the lugs being disposed inwardly and outwardly of one another.

3. Differential gearing comprising in combination axle sections, gears secured to the sections respectively, a drum, means for driving the drum, a driving spider in the drum, and axially shiftable clutch-members driven by the spider, disposed between the spider and said gears respectively, having teeth for engaging said gears respectively, having limited rotation relatively to the spider and to each other and provided with overlapping integral stop lugs disposed inwardly and outwardly of one another and having substantially chordal engaging surfaces.

4. Differential gearing comprising in combination axle sections, gears secured to the sections respectively, a drum, means for driving the drum, a driving spider in the drum, and axially shiftable clutch-members driven by the spider, disposed between the spider and said gears respectively, having teeth for engaging said gears respectively, having a limited rotation relatively to the spider and provided with overlapping integral stop-lugs disposed inwardly and outwardly of one another, the lugs on one member having substantially chordal engaging surfaces and the lugs on the other member having contiguous surfaces with portions relatively inclined to each other.

5. Differential gearing comprising in combination axle sections, gears secured to the sections respectively, a drum, means for driving the drum, a driving spider in the drum provided with arms, and axially shiftable clutch-members driven by the spider disposed between the spider and said gears respectively, having teeth for engaging said gears respectively, having limited rotation relatively to the spider and to each other and provided with recesses adjacent the sides of the spider to permit axial movement of the clutch-members and driving notches adjacent the front of the arms of the spider to form driving surfaces which will not exert excessive spreading pressure upon the clutch-members.

6. Differential gearing comprising in combination axle sections, gears secured to the sections respectively, a drum, means for driving the drum, a driving spider in the drum provided with arms, axially shiftable clutch-members driven by the spider disposed between the spider and said gears respectively, having teeth for engaging said gears respectively, having limited rotation relatively to the spider and to each other and provided with recesses adjacent the sides of the spider to permit axial movement of the clutch-members and driving notches adjacent the front of the arms of the spider to form driving surfaces which will not exert excessive spreading pressure upon the clutch-members, and stop-means for limiting the relative rotation of the clutch-members.

LEO PONDELICK.